INVENTOR.
JOHN P. BOLANOWSKI
BY Charles A. Campbell
ATTORNEY

United States Patent Office 2,726,960
Patented Dec. 13, 1955

2,726,960

PROCESS FOR PRODUCING GELLED CONFECTIONS

John P. Bolanowski, Jeffersonville, Ind., assignor, by mesne assignments, to National Cylinder Gas Company, Chicago, Ill., a corporation of Delaware Application February 13, 1953, Serial No. 336,709

11 Claims. (Cl. 99—134)

This invention relates generally to confections, and more particularly to gelled confections which are made by cooking slurries of starches and sugars to produce well-known types of starch jelly candies such as gum drops, jelly beans, orange slices, mint leaves, etc. Specifically, the invention relates to a continuous process for manufacturing such confections and to the superior confections produced thereby.

Heretofore confections such as those enumerated have been manufactured by a time-consuming batch process requiring skilled personnel and extending over a period of several days. This prior process involves the preparation of a relatively dilute slurry of sugar, corn syrup and starch containing two or three times the amount of water desired in the finished confection. For example such slurries usually contain about 50% water and the confections produced therefrom contain only about 20% water. The slurry is cooked in an open kettle to reduce the water content to approximately 25% and to gelatinize or cook the starch so that it sets upon cooling. After the cooking operation, the resultant viscous solution is flavored and colored and transferred to a depositor hopper. After addition of flavoring and coloring the product is cast into mold cavities which previously have been formed in dry molding starch in trays. The product is allowed to cool to room temperature in these molds, the cooling time depending on the size of the pieces, and being in the neighborhood of 8 to 10 hours for average gum drops. The cooled trays containing the confection pieces are then placed in a drying room maintained at a temperature of about 125° F. and at constant low humidity for two days, during which time the moisture content of the product is substantially reduced. The trays containing the starch molds are then removed from the drying room and allowed to stand at room temperature and humidity for two more days. This brings the pieces to their final moisture content of about 20%. Next the gum pieces and the starch are separated on a screen and the starch, now relatively moist, is dried for reuse in subsequent molding operations.

This process is far from satisfactory in several respects. Large amounts of heat are required to reduce the water content in the open kettles, to maintain the high temperature in the drying room, and to dry the separated molding starch for reuse. Moreover the over-all process requires a period of four or five days, during most of which time the candy is stored in cumbersome trays necessitating large air conditioned plant areas and considerable manual handling.

When attempts have been made in the past to at least partially eliminate this large heat requirement and to reduce the period of storage in the drying room by evaporating the slurry to final moisture content in the open kettles, it has been found that excessive caramelization of the ingredients occurred because of extended cooking time, local overheating and the fact that the cooking temperature had to be progressively increased.

One fundamental concept of my invention is to provide an initial slurry having a moisture content substantially the same as that desired in the finished confection, thereby eliminating the need for evaporative cooking and for drying in the molds. Starch cooking involves heating a suspension of starch and water until such time as the starch granules swell and are ruptured so that they may set when subsequently cooled. Before the present invention, it was believed to be impossible to cook starch and sugar slurries in the presence of such a small amount of water as is found in starch gum confections, and still achieve complete starch gellation, without deleterious effects upon the sugars which would make the cooked product unsatisfactory for a confection. However, I have found that when the cooking is carried out in accordance with the method of my invention, the desired swelling of the granules is obtained with the production of a clear colloidal solution which, upon cooling, sets to form the desired clear semi-solid, gummy mass. I have further discovered that, by carefully controlling the temperature and pressure upon the gum slurry during the cooking operation, and by rapidly cooling after cooking, the desired swelling and rupture of the starch granules can be accomplished in the presence of as little as 15% water, and that the resultant gel has good clarity and other desirable physical characteristics. Using somewhat more water, about 20%, I have found that gums can be produced that are notably superior to those heretofore provided by the conventional method of preparation.

The confections produced by the prior process frequently do not have good clarity and tend to have tough outer skins which make them excessively gummy when chewed. These tough outer skins are attributable to the excessive drying of the outer layers of the confection pieces which inevitably occurs when the over-all moisture content of the piece is reduced by the dry starch of the mold. Moreover, considerable skill on the part of the kettle operator is required in order to achieve uniformity from batch to batch. Caramelization of the candy due to overcooking and uncontrolled inversion of sugars is also likely to occur.

The improved candy produced by my process is uniform in composition throughout each piece and from one batch to the next, has excellent clarity, and is free from caramelization. Moreover, the amount of sugar inversion is a predictable constant in my process and compensation may be made in the formulation to insure the desired amount of invert sugar in the finished candy. The excellent clarity and casting quality of my improved confection is believed to be due to the freedom from caramelization and to the complete rupturing of all the individual starch granules.

Two important objects of my invention are to reduce the time involved in the manufacture of gelled confections and to reduce to a minimum the amount of heat required for the production of such confections.

A related object is to provide apparatus for cooking the confection slurry in the presence of a minimum amount of water, thereby eliminating the need for removing water by evaporation during the cooking process and later by absorption into the molding starch.

A further object is to provide a process wherein starch molds need not be used; or, in the event that they are used, the starch may be more moist and the amount of redrying prior to being used for subsequent batches may be greatly reduced, thus reducing both the heat required and the danger of explosion normally incident to the drying and handling of large quantities of starch.

Another object is to provide an improved confection having superior optical clarity, more palate appeal and a uniform composition throughout the individual piece whereby the hardened skin which is characteristic of such candy pieces heretofore produced is eliminated.

Other objects and advantages of the process and product of this invention will be apparent to those familiar with the art upon reading the following specification in conjunction with the drawing and the appended claims.

A preferred form of apparatus for carrying out my improved process is illustrated in the drawing in which.

Figure 1:
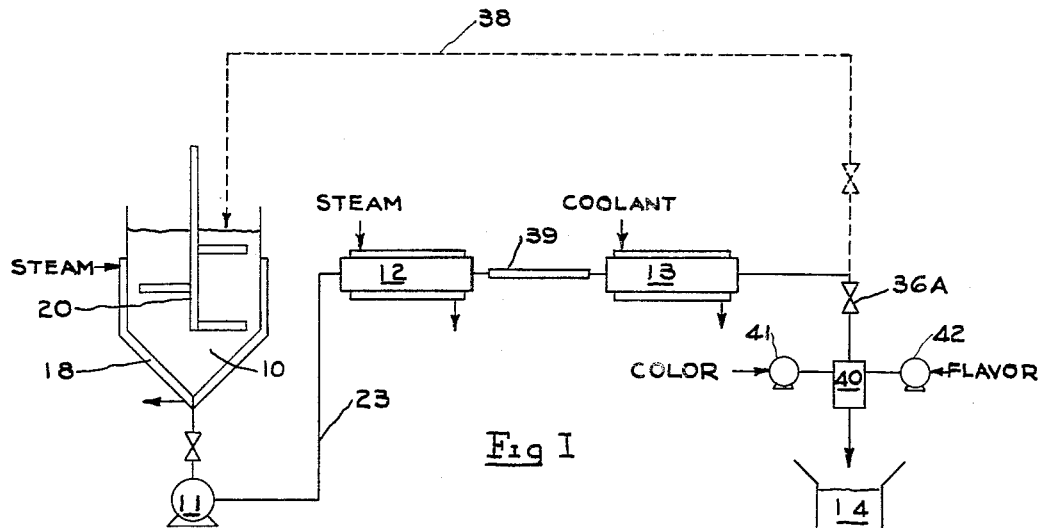
Fig. 1 is a schematic diagram of the apparatus.

The illustrated apparatus for carrying out the process of my invention comprises a steam jacketed kettle 10, a feed pump 11, a cooking heat exchanger 12, a cooling heat exchanger 13, a depositor hopper 14, a mold conveyer 15, an unmolder 16 and a coating applicator 17. The mixing kettle 10 is provided with a steam jacket 18 so that steam may be introduced to heat the contents to a temperature at which they may be readily handled by the pump 11. The kettle also is provided with a motor-driven agitator 20 which stirs the contents at a sufficient rate to maintain the solids in suspension without introducing air.

In most instances it is preferred to provide at least two identical mixing kettles 10, each connected through suitable valves to the pump 11, so that one kettle may be filled with a batch during the period when the other is being emptied by the pump. In this way uninterrupted operation of the remainder of the system is maintained. The pump 11, which is a conventional sanitary pump suitable for use with foods, is preferably of such capacity as to provide a flow equivalent to the throughput rate of the system at the desired output pressure.

Figure 2:
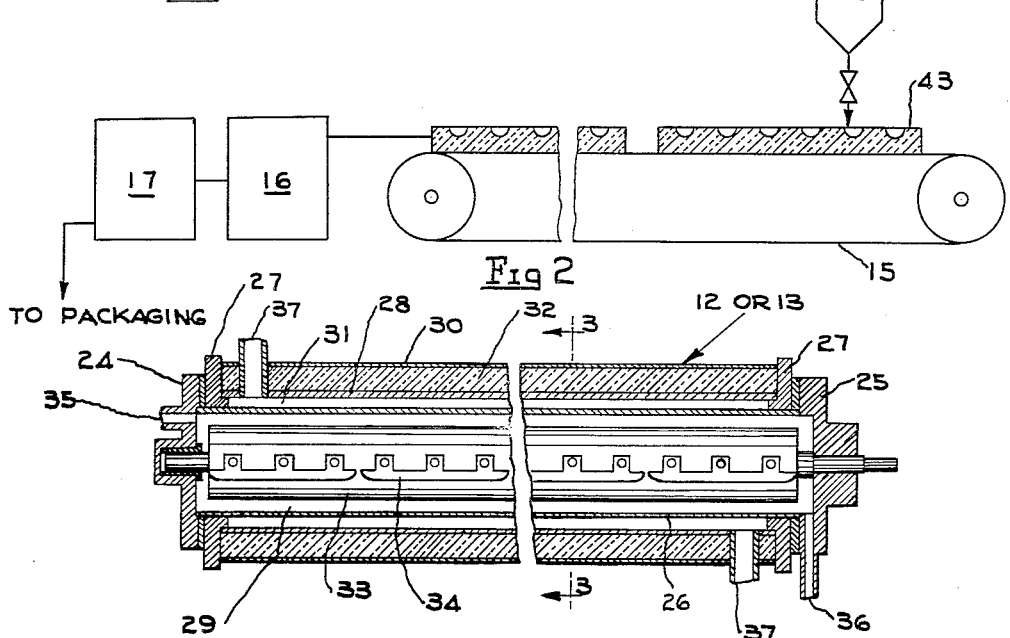
Fig. 2 is a longitudinal section illustrating the internal construction of a preferred form of heat exchange unit.
Figure 3:
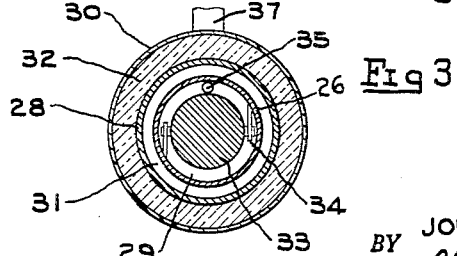
Fig. 3 is a transverse section taken on line 3—3 of Fig. 2.

The cooking heat exchanger 12 and the cooling heat exchanger 13 preferably are of the same fundamental construction, so that Figs. 2 and 3 are illustrative of either of these two heat exchangers. Each heat exchanger comprises a pair of generally circular end plates 24 and 25 recessed to receive the ends of a heat transfer tube 26. Ring members 27 are sleeved on the tube 26 adjacent to the end plates and support a pair of cylindrical elements 28 and 30. Thus an annular space 31 for the heating medium or cooling medium, as the case may be, is provided surrounding the tube 26. The space between the sleeves 30 and 28 is preferably filled with insulation 32 in order to prevent the flow of heat to or from the atmosphere.

The end plates 24 and 25 are provided with appropriate bearings and seals for journaling an agitator shaft 33 and sealing the point at which the shaft 33 passes through the plate 25. The agitator shaft 33 fills a major portion of the space within the heat transfer tube 26, and, together with the tube, forms a thin elongated annular passage 29 for the material to be processed. The agitator shaft carries a plurality of blades or scrapers 34 which serve to prevent material from sticking to the heat transfer tube 26 and also serve to violently agitate the material as the shaft 33 is rotated at relatively high speed by a suitable motor (not shown). In practicing my present invention I prefer to drive the agitator shaft at a speed of about 350 R. P. M. in the case of the cooling unit and about 500 R. P. M. in the cooking unit. The violent agitation, in addition to preventing local overheating, also insures complete mixing and aids in the breakdown of the starch granules. The product enters the heat exchanger through an inlet conduit 35 at one end and leaves through an outlet conduit 36 at the opposite end. The heat transfer medium is conducted to and from the annular space 31 surrounding the tube 26 by conduits 37.

To those familiar with the art of heat transfer it will be readily apparent that the units 12 and 13 effect very rapid, efficient heating and cooling of the product under closely controlled conditions of temperature, pressure and degree of agitation or mixing. Although only one heating unit and one cooling unit have been shown in the drawing it is contemplated that two or more heating units or cooling units connected in series or parallel may be used to increase the capacity of the system.

In the case of the cooking heat exchanger 12, heating medium is supplied to the space 31 of the unit such as illustrated in Figs. 2 and 3. Slurry from the kettle 10 is supplied to the cooking unit through conduit 23 and inlet 35, and the slurry is rapidly and uniformly heated as it advances in the form of a thin confined layer through the annular zone 29 of the heat exchange unit. While the slurry is in this zone, the disruptive effect of the high temperature and the violent agitation initiates the breakdown of the starch granules. The starch cooking continues in the conduit 39 interconnecting the two heat exchange units due to residual heat and may continue after the slurry passes out of this conduit into the cooling unit 13 where the temperature of the slurry is rapidly reduced substantially to the desired casting temperature by reason of flow of cooling medium through the space 31 of the heat exchange unit such as illustrated in Figs. 2 and 3. The length and diameter of the conduit 39 may be varied to alter the high temperature holding time, thereby to control the extent of the cooking. As will be demonstrated by the specific examples which follow, the cooking temperature and holding time are interrelated, and either can be varied to compensate for changes in the other. For example, if it is desired to cook at a lower temperature, a longer holding time may be used to obtain the same degree of starch conversion. The optimum cooking temperature and holding time will vary for different confections but for any given confection may be readily determined by experiment, as will be understood by those skilled in the art. Generally, the lower the moisture content of the slurry the higher the cooking temperature or the longer the holding time must be in order to accomplish complete cooking. By way of example, a cooking time of less than one minute has proved satisfactory for a cooking temperature of 280° F. to 285° F. while a three minute cooking time has been utilized with a cooking temperature of about 250° F.

In the cooling unit 13 the material from conduit 39 is rapidly and uniformly cooled as it advances in the form of a thin confined layer through the annular zone 29, the space 31 of the heat exchange unit in this case being supplied with suitable coolant. The rapidly rotating blades 34 continuously scrape the material from the heat transfer wall of the tube 26, accelerating the cooling rate and thus stopping the cooking after a predetermined period has elapsed. The rate of cooling in the unit 12 is preferably so established that the temperature of the emerging cooled material is slightly below the boiling point of the material at atmospheric pressure. Somewhat lower temperatures may be employed, but generally lower temperatures result in a product which is too viscous to cast properly. For most confections the slurry boils between 217° F. and 222° F., depending upon the type and combination of sugars and the amount of water initially present.

The pressure in the system is maintained and controlled by a throttling valve 36a in the outlet 36 of the cooling exchanger 13. By means of this valve sufficient pressure is maintained in the heating and cooling zones to prevent evaporation of water vapor from the slurry in the cooking zone of unit 12 and conduit 39. The pressure on the slurry is reduced to atmospheric as the slurry passes through the valve. I have found it to be desirable to allow a small amount of the moisture to evaporate or flash to steam as the pressure is reduced, effecting a small amount of flash cooling. The amount of flashing is preferably only about one percent so that spattering which would cause product degradation does not occur. This arrangement permits slightly more moisture in the heated slurry facilitating gellation.

To aid in putting the system in operation a recycle line 38 (shown in broken lines) is preferably provided to permit the return of product to the slurry kettle 10. The heating unit 12 is preferably heated with steam which may, if desired for further economy, be conducted from this unit to the jacket 18 of the slurry kettle which is heated to a lower temperature. The cooling unit 13 preferably utilizes cold water as the heat transfer medium. Alternatively, refrigerated brine or other conventional and suitable coolants may be employed.

From the cooling unit 13 the cooked and cooled product is fed to a coloring and flavoring device 40 which is essentially a mixer to which color and flavor are supplied by metering pumps 41 and 42. From the mixer the product flows to a depositor hopper 14 for casting into molds 43. The molds may be starch molds of the conventional type, or since drying in the mold is not required in my process permanent molds formed of non-absorbent material may be used.

The molded pieces may be quickly cooled in a tunnel or cold room (not shown) or allowed to cool at a slower rate at room temperature. Whichever procedure is used, when cooled and gelled to sufficient hardness, the pieces are removed from the molds preferably by conventional unmolding apparatus 16 and prepared for packing as for example by coating with sugar or fat by means of conventional and suitable coating apparatus 17. A mold conveyor 15 has been shown in the drawing as conveying molds from the depositor 14 to the unmolder 16. In many instances, however, it is contemplated that the molds will be filled and then stacked during the setting period. At the end of this period when the pieces are sufficiently hard the molds will be conveyed to the unmolder.

Formation of the desired gel requires some period of time after cooling, but this period is relatively short. Consequently extensive storage facilities, such as the heated rooms heretofore used, need not be provided. I have found that a 24-hour cooling period is more than adequate in all cases, and this period is particularly convenient since one day's production may be removed from the molds, coated, and packed the following day. This, of course, is a remarkable saving in time when compared with the old conventional process which requires four or five days.

The following specific examples are representative of my improved process:

Example A

A slurry having the following composition was prepared in a jacketed kettle and heated to a temperature of 185° F.

|   | Pounds |
|---|---|
| Corn syrup (20% water) | 45 |
| Sucrose (dry) | 30 |
| Starch (65 fluidity) | 12 |
| Water | 15.5 |

The corn syrup consisted essentially of a glucose solution having a density of 42° Baumé corresponding to a water content of approximately 20%. Accordingly the moisture content of the slurry was about 24%. The starch was an acid modified corn starch known as Flogel 65 supplied by the National Starch Company, 270 Madison Avenue, New York, New York. Other starches such as sago may be used in my process, but I prefer to use cornstarch which forms a gel of better clarity.

The slurry was pumped from the kettle 10 at a rate of 25 lbs. per hour through the cooking heat exchanger 12, the holding conduit 39 and the cooler 13 and was filled into conventional starch molds. The cooking unit raised the temperature to approximately 250° F. and the product emerged from the cooler having a temperature of about 210° F. The slurry was held at cooking temperature for about three minutes, cooking being initiated in the cooking unit 12 and continuing in the conduit 39. The heating unit shaft speed was 500 R. P. M. and the cooling unit shaft speed was 350 R. P. M. The pressure in the closed system was approximately 50 p. s. i. g. Coloring, citric acid and fruit flavor were added to the cooled product just prior to casting. After being cast, the pieces were allowed to cool at room temperature for 24 hours and then removed from the molds, coated with sugar, and packaged. The clarity and body of the final pieces were excellent. The total solids content was 77% as determined by a refractometer, indicating 23% moisture in the product. The one percent reduction in moisture is believed to be due largely to evaporation upon the release of the pressure after cooling.

Example B

A slurry was prepared as in the previous example but having somewhat different composition, namely:

|   | Pounds |
|---|---|
| Corn syrup (20% water) | 30 |
| Sugars: | |
|     Invert (dry) | 10 |
|     Sucrose (dry) | 2.2 |
|     Sucrose solution (40% water) | 29.7 |
| Starch | 6.8 |

This slurry which had a moisture content of approximately 23%, was prepared and heated in the kettle until it had a temperature of about 170° F. It was then pumped to the cooking unit where the temperature of the slurry was rapidly raised to about 285° F. This cooking temperature was maintained for less than one minute, the conduit 39 being short in length and of small diameter. The slurry was cooled to about 208° F. in the cooling unit, at which temperature it was cast into molds. The pressure within the heat transfer units was 30 p. s. i. g. and the throughput rate was 75 lbs. per hour. After casting in starch molds and cooling for 24 hours the resultant gum had excellent body and clarity and a total solids content of 79.4%, as measured by a refractometer, indicating a moisture content of about 20.6%. In each of the preceding examples, small amounts of flavoring and coloring were added in the usual manner just prior to casting.

From the two examples it will be apparent how the cooking temperature can be lowered if the holding time is increased and vice versa. It is believed that the holding time is an inverse logarithmic function of the cooking temperature. The maximum cooking temperature which is feasible for use in my process is believed to be about 290° F. for most slurry formulations. At higher temperatures, even with very short holding times on the order of a few seconds, excessive degradation of the starch and sugars occurs. The minimum practicable cooking temperature is approximately 240° F. At this temperature the holding time is about fifteen to about thirty minutes. Somewhat lower temperatures may be used and rupture of the granules still can be achieved, but the holding time becomes quite long and full advantage of my novel process is not achieved. The minimum holding or cooking time is achieved by connecting the cooling unit 13 directly to the material outlet of heating unit 12. Even with such an arrangement an appreciable cooking time is involved for cooking occurs during the material travel through the latter portion of the cooking unit and the initial portion of the cooling unit.

Example C

A slurry having a very low moisture content was prepared in a jacketed kettle in accordance with the following formula:

|   | Pounds |
|---|---|
| Corn syrup (21% water) | 30 |
| Sugar: | |
|     Sucrose (dry) | 22 |
|     Sucrose (32° Bé. solution) | 12 |
| Starch | 10 |

The 32° Bé. sucrose solution had a 60% solids content so that the 12 pounds added actually consisted of about 7.2 lbs. sucrose and about 4.8 lbs. of water. The resultant slurry contained only about 15% water. Coloring and licorice extract were added in the kettle to give the required flavor and depth of color and the slurry was processed as in the previous examples. The holding time at cooking temperature was one minute, and the cooking temperature was 288° F. The temperature of the product leaving the cooler was 222° F. The pressure in the heat exchangers was 60 p. s. i. g. Instead of being cast into starch molds, the product was cast in a non-absorbent water impervious mold. The cast product was quit viscous and, after setting overnight, was very similar to conventional licorice candy being somewhat more readily chewable without sticking to the teeth. The total solids in the cast product was 85%.

The low moisture content of this sample, namely 15%, is about as low as can be practically employed in my process. Conversely, from a practical standpoint, the highest moisture candy obtainable by my process is thought to be about 25%. Higher contents can possibly be employed with proper formulation but the resultant gums would probably be too tender for convenient packaging. Within the above range of moisture content, confection slurries of the type contemplated can be readily cooked by relatively rapid heating and cooling while agitating under pressure to produce the desired gel or gum without the need for removal of water by subsequent evaporation or absorption.

The most important advantage of my novel process is the great reduction of time required. In the prior process the cast pieces have to be kept in the starch molds for a period of four or five days while in my process the gum may be completely procesed and packaged for shipment in a single day. This saving in time in process produces a proportional saving in plant space required, for the inventory of molding starch and molds is but a small fraction of that required in the prior process.

Another saving effected is in steam consumption due to the fact that the large steam requirement to supply the latent heat of evaporation to the cooking ketttles in the prior process is eliminated. There is also reduction in the number of men required to run the process and a substantial improvement in the quality of the product due to the fact that the cooking operation is so closely controlled in my process.

Samples of the confections produced by the procedures outlined above have been illuminated by polarized light during examination under a microscope and compared with confections having the same composition made by conventional methods. The samples of conventional confections examined under a magnification of 900X exhibited birefringence, which is characteristic of unruptured starch granules. The samples of confection prepared by my process and viewed under the same magnification and polarized light exhibited no birefringence which is indicative of the freedom from any unruptured granules. Moreover, under normal light and the same magnification no unruptured granules were visible in samples of my improved confections while such granules were detected in conventional confections. Thus it is apparent that more complete starch granule swelling and disintegration is obtained by my improved process, producing a confection different than any heretofore produced. The freedom from visible fragments and unruptured granules is believed to be responsible for the remarkable transparency or clarity of my confection as compared with prior confections made from the same ingredients.

The absence of the usual tough skin in the confections made according to my invention is of course due to the fact that appreciable drying does not occur in the forming molds. When starch is used as in Examples A and B a small amount of mold drying may, of course, occur, but since the starch need not be nearly as dry as in the prior process and since the residence time in the molds is but a small fraction of that used in the prior process virtually no excessively dry, tough skin is formed even when starch is used.

My process, as described above, also contemplates the use of molds which do not absorb any moisture, such as metal, plastic or elastomeric materials which are reusable. Another technique which may be followed is to employ cups of plastic film, metal foil or paper as molds which are packed and sold with the confection pieces therein. This of course is not practical utilizing the prior process.

Although my process has been described herein as applied to confections in which starch is the sole gel material, the process, of course, can be used to very good advantage when additional gelling agents such as gelatine or gum arabic are used in conjunction with starch as is conventionally done in the formulation of certain starch jelly confections.

Various changes or modifications in the process or product, in addition to those set forth herein and such as will present themselves to those familiar with the art, may be made without departing from the spirit of my invention the scope of which is commensurate with the following claims.

What is claimed is:

1. The method of manufacturing gelled confections having a moisture content of between about 15% and about 25%, which comprises forming a slurry of carbohydrates having substantially the water content desired in the finished confection and containing a substantial amount of starch, heating the slurry to a temperature above that corresponding to the boiling point of said slurry at atmospheric pressure while maintaining sufficient pressure thereon to prevent boiling of the slurry during said heating, holding the heated slurry at said temperature and pressure for a period sufficient to allow the starch therein to cook, rapidly cooling the cooked slurry to a temperature below the boiling point of the slurry at atmospheric pressure, and forming the product into confection pieces.

2. The method of manufacturing gelled confections having a moisture content of between about 15% and about 25%, which comprises forming a slurry of carbohydrates having a water content from about one percent to about three percent in excess of that desired in the finished confection and containing a substantial amount of starch, heating the slurry to a temperature above that corresponding to the boiling point of said slurry at atmospheric pressure while maintaining sufficient pressure thereon to prevent boiling of the slurry during said heating, holding the heated slurry at said temperature and pressure for a period sufficient to allow the starch therein to cook, rapidly cooling the cooked slurry to a temperature near the boiling point of the slurry at atmospheric pressure, releasing the pressure upon the cooled slurry to allow the excess water to evaporate and flash cool the slurry to a still lower temperature, and then forming the product into confection pieces.

3. A process for producing a confection comprising a gel of carbohydrate substances including sugar and starch in a predetermined amount of water, said process including preparing a slurry containing said carbohydrate substances and said predetermined amount of water, agitating said slurry to maintain the solids in suspension and simultaneously heating to a temperature below the atmospheric boiling point of the slurry, passing the slurry in a thin confined layer under super-atmospheric pressure through a heating zone while violently agitating and heating the slurry to a cooking temperature above about 240° F. but below that at which it will boil at said superatmospheric pressure, maintaining the slurry at the aforesaid cooking temperature and under said super-atmospheric pressure until substantially all the starch is cooked, rapidly cooling the cooked slurry to a temperature below that at which it will boil at atmospheric pressure, by passing the cooked slurry in a thin confined layer through a cooling zone, while violently agitating and while still under said super-atmospheric pressure, then releasing the pressure on the cooled slurry, and forming the cooled slurry into confection pieces.

4. A process for producing a confection comprising a gel of carbohydrate substances including sugar and starch in a predetermined amount of water, said process including preparing a slurry containing said carbohydrate substances and said predetermined amount of water, passing the slurry in a thin confined layer under super-atmospheric pressure through a heating zone while violently agitating and heating the slurry to a cooking temperature above about 240° F. but below that at which it will boil at said super-atmospheric pressure, maintaining the slurry at the aforesaid cooking temperature and under said super-atmospheric pressure for about one to three minutes, rapidly cooling the cooked slurry while still under said super-atmospheric pressure to a temperature below that at which it will boil at atmospheric pressure, releasing the pressure on the cooled slurry, and forming the cooled slurry into confection pieces.

5. The method of making gelled confections having a moisture content of between about 15% and about 25%, which comprises mixing an aqueous slurry of sugar and starch containing substantially the amount of water desired in the finished confection, continuously feeding a stream of said slurry in a thin confined layer under super-atmospheric pressure endwise to and through an elongated heating zone having a heat transfer wall and raising the temperature of the stream in said zone to a temperature above the atmospheric boiling point of the slurry to cook the starch, rapidly cooling the cooked slurry to a temperature at which the pressure thereon may be released without excessive evaporation of water by feeding the cooked slurry in a thin confined layer, under super-atmospheric pressure, endwise to and through an elongated cooling zone having a heat transfer wall, then releasing the pressure on the slurry, and casting the cooled slurry into molds.

6. The method of making gelled confections which comprises forming a slurry of sugar and starch in water at a temperature below the boiling point thereof, said slurry containing between about 15% and about 25% water, forming a stream of said slurry, continuously raising the pressure upon the stream of said slurry and heating said stream to a temperature above between about 240° F. and about 290° F. to cook the starch, cooling the stream of cooked slurry to a lower temperature at which the pressure thereon may be released without evaporation of substantial amounts of water, then releasing said pressure, and transferring the cooled slurry to molds for further cooling and gellation without appreciable water absorption by the molds.

7. The method of making confections having a moisture content of between about 15% and about 25%, which comprises mixing an aqueous slurry of sugar and starch containing substantially the amount of water desired in the finished confection, continuously feeding a stream of said slurry in a thin confined layer, under super-atmospheric pressure through a heating zone having a heat transfer wall to raise the temperature above the atmospheric boiling point of the slurry and cook the starch, rapidly cooling the cooked slurry to a temperature below the atmospheric boiling point of the slurry by feeding the same in a thin confined layer, under super-atmospheric pressure, through a cooling zone having a heat transfer wall, continuously agitating said slurry while in said heating and cooling zones, and forming the cooled product into individual pieces for further cooling and gellation without appreciable moisture release therefrom.

8. The method of making confections having a moisture content of between about 15% and about 25%, which comprises mixing a slurry of sugar and starch in water containing substantially the amount of water desired in the finished confection, feeding a stream of said slurry continuously in a thin confined layer under super-atmospheric pressure endwise to and through an elongated heating zone having a heat transfer wall to raise the temperature above the atmospheric boiling point of the slurry but not above the boiling point of said super-atmospheric pressure and cook the starch therein, continuously agitating said slurry while in said heating zone, and cooling the cooked slurry.

9. A process for producing a gelled confection comprising forming a slurry at a temperature of approximately 175° F. containing carbohydrates and water, the water content of said slurry being between about 15% and about 25%, subjecting a stream of said slurry to an elevated pressure of at least 15 p. s. i. g., transferring heat to the stream to raise the temperature thereof to between about 240° F. and about 290° F., maintaining the stream at the elevated temperature a short time, then rapidly cooling the stream to a temperature below about 222° F. by transferring heat away from same, releasing the pressure on said stream, separating the stream into individual bodies, and allowing said bodies to further cool and gel to form confection pieces.

10. A process for producing a gelled confection comprising forming a batch of an aqueous slurry containing carbohydrates including a substantial amount of starch, the water content being approximately 20%, subjecting a stream of said slurry to an elevated pressure, transferring heat to the stream to raise the temperature thereof above 240° F., said elevated pressure being above the vapor pressure of the slurry at the aforesaid temperature, maintaining the stream at that temperature for a period of from one to three minutes, thereafter cooling the stream to a lower temperature at which its vapor pressure is less than atmospheric by transferring heat away from same, releasing the pressure on said stream, separating the stream into individual bodies, and allowing said bodies to gel to form confection pieces.

11. A process for continuously producing a carbohydrate gel type confection containing sugar and starch and having a moisture content of between about 15% and about 25%, the moisture content being approximately twice the starch content; said process including preparing a slurry containing sugar, starch and water in approximately the proportions desired in the finished confection; continuously passing a stream of the slurry under super-atmospheric pressure through a heating zone and heating the stream of slurry to a cooking temperature above about 240° F. but below that at which it will boil at said super-atmospheric pressure; maintaining the slurry at the aforesaid cooking temperature and under super-atmospheric pressure for a short time and until the starch therein is cooked; rapidly cooling the cooked slurry to a temperature below that at which it will boil at atmospheric pressure by passing the stream through a cooling zone still under said super-atmospheric pressure; releasing the pressure on the cooled slurry; and forming the cooled slurry into confection pieces.

References Cited in the file of this patent

UNITED STATES PATENTS

| 1,928,901 | Krno | Oct. 3, 1933 |
| 2,266,051 | Lebeson | Dec. 16, 1941 |
| 2,406,585 | Buchanan et al. | Aug. 27, 1946 |

FOREIGN PATENTS

| 346,136 | Great Britain | Apr. 9, 1931 |